United States Patent [19]

Woods

[11] 4,211,005
[45] Jul. 8, 1980

[54] APPARATUS FOR CUTTING VEGETATION

[75] Inventor: Donald M. Woods, Houston, Tex.

[73] Assignee: Emerson Electric Co., St. Louis, Mo.

[21] Appl. No.: 957,381

[22] Filed: Nov. 3, 1978

Related U.S. Application Data

[63] Continuation of Ser. No. 818,626, Jul. 25, 1977, abandoned.

[51] Int. Cl.² .................... A01G 3/06; A01D 35/26
[52] U.S. Cl. .................................... 30/276; 56/12.7
[58] Field of Search .................. 30/276, 347; 56/12.7, 56/295; 51/335

[56] References Cited

U.S. PATENT DOCUMENTS

| | | | |
|---|---|---|---|
| 2,709,323 | 5/1955 | Swan | 51/335 |
| 2,854,798 | 10/1958 | De Haven | 51/335 |
| 3,826,068 | 7/1974 | Ballas et al. | 56/295 X |
| 3,928,911 | 12/1975 | Pittinger, Jr. | 30/276 |
| 4,118,864 | 10/1978 | Pittinger et al. | 30/276 |
| 4,134,204 | 1/1979 | Perdue | 30/276 |

Primary Examiner—Jimmy C. Peters

[57] ABSTRACT

An apparatus, such as an edger, trimmer or lawnmower, for cutting vegetation using a flexible non-metallic line member extending into a cutting plane from a rotating head (e.g., U.S. Pat. Nos. 3,708,967, 3,826,068; 3,859,776). At the user's signal during cutting, the line member is fed to a certain discrete length (2 inches) from the rotating head under direct mechanical control (no free wheeling). Then the line member is automatically relocked within the head.

48 Claims, 16 Drawing Figures

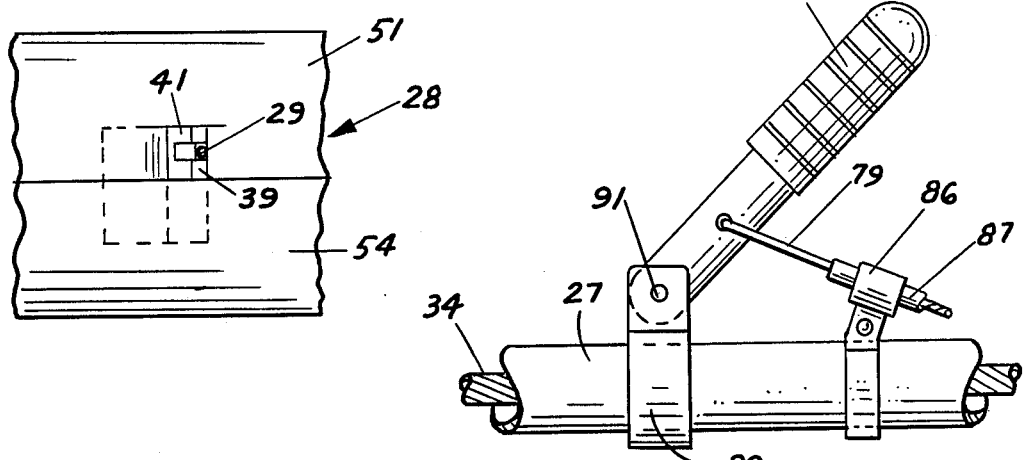
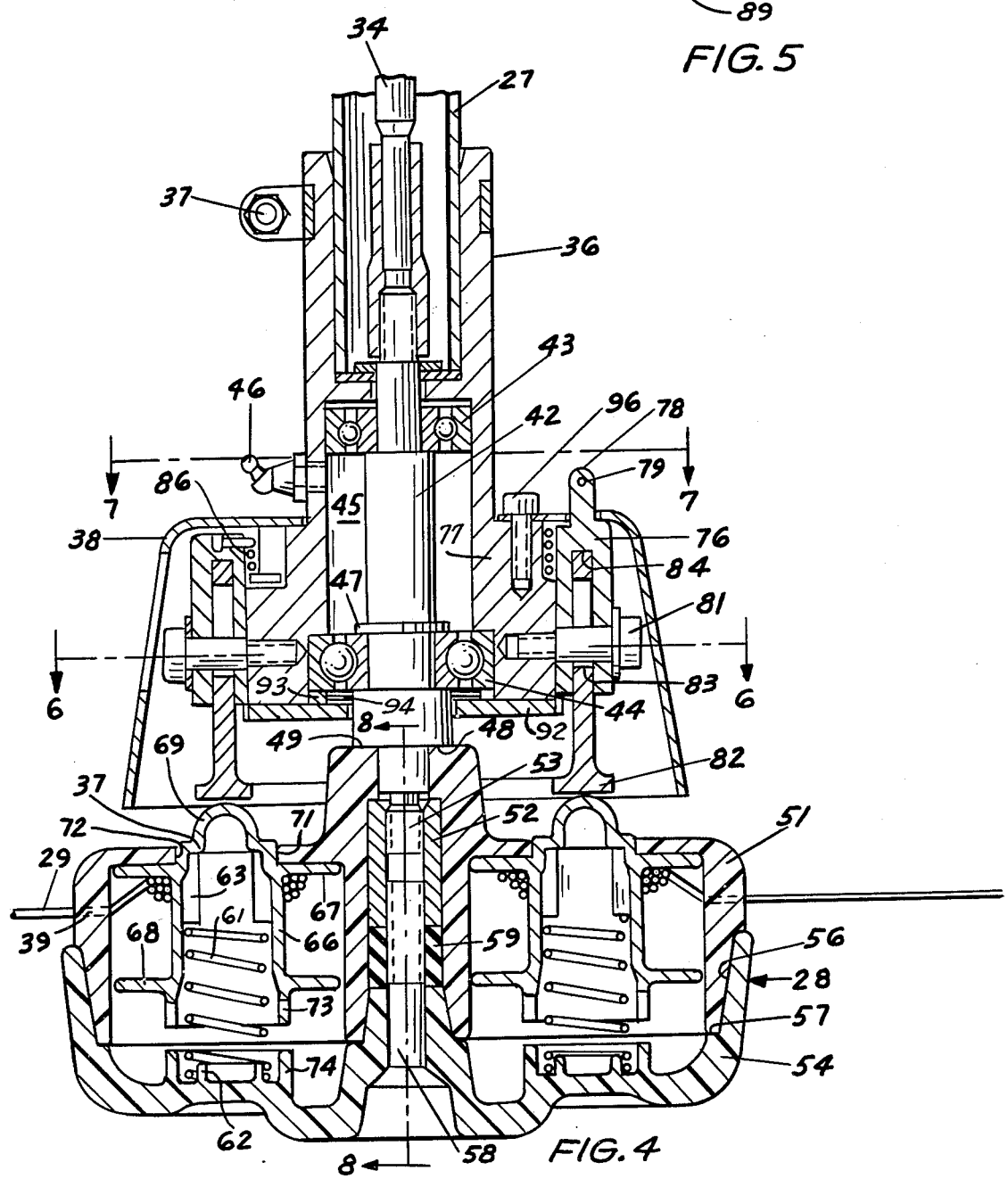

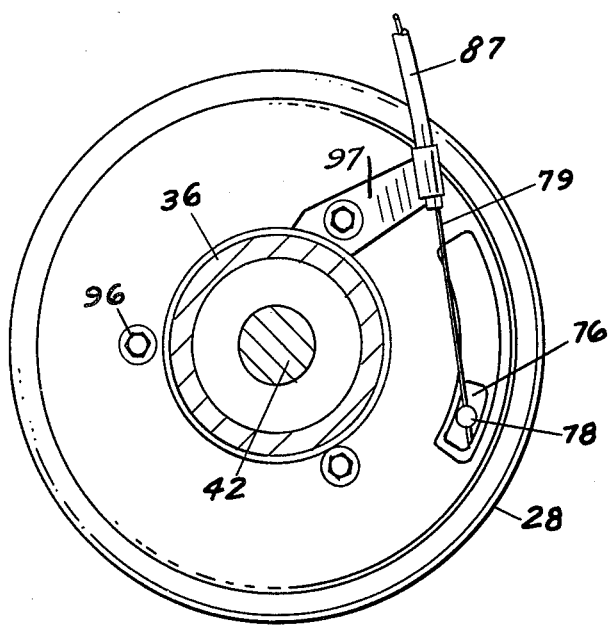
FIG. 7
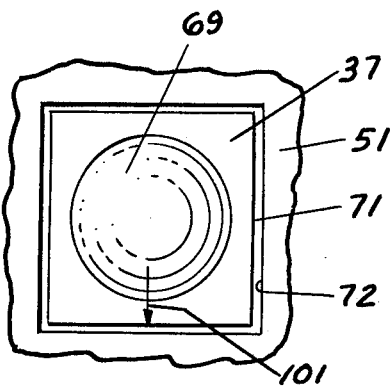
FIG. 9
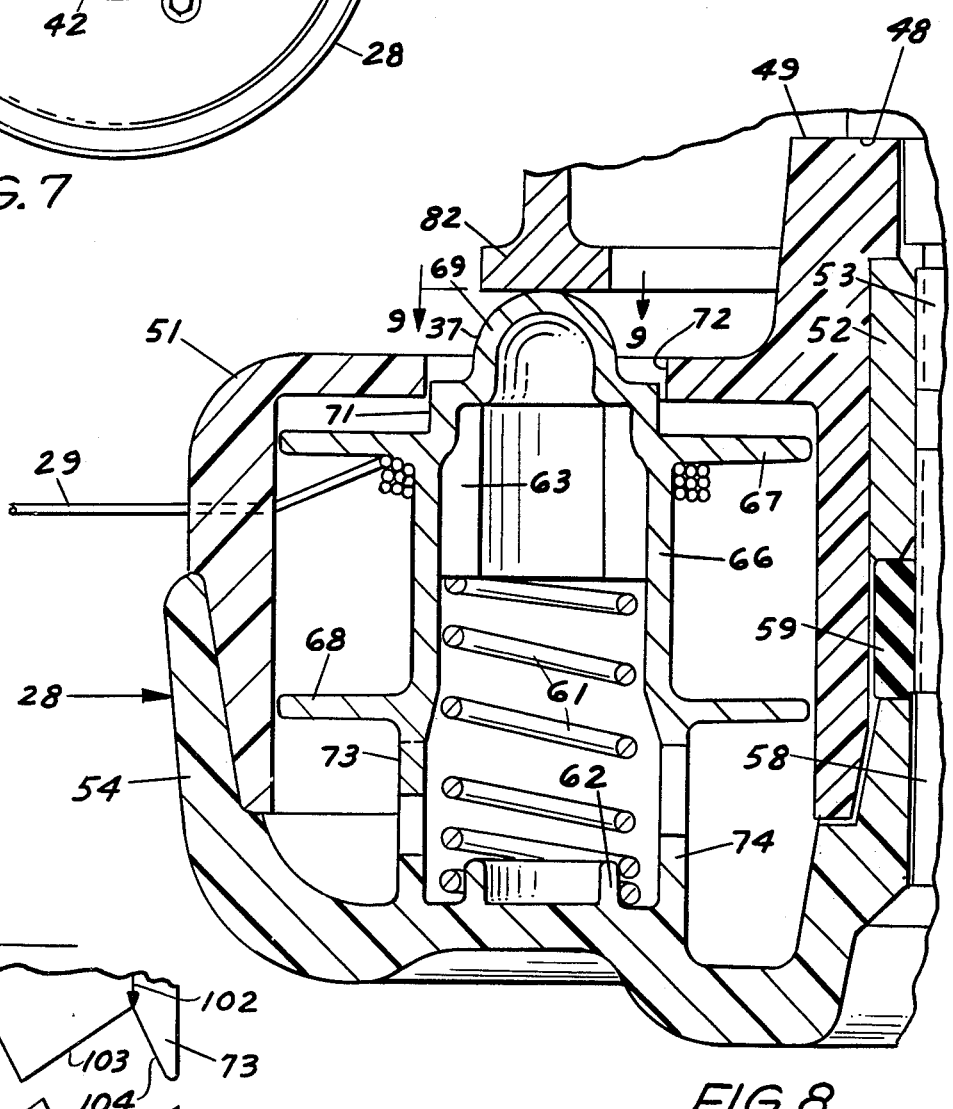
FIG. 8
FIG. 10

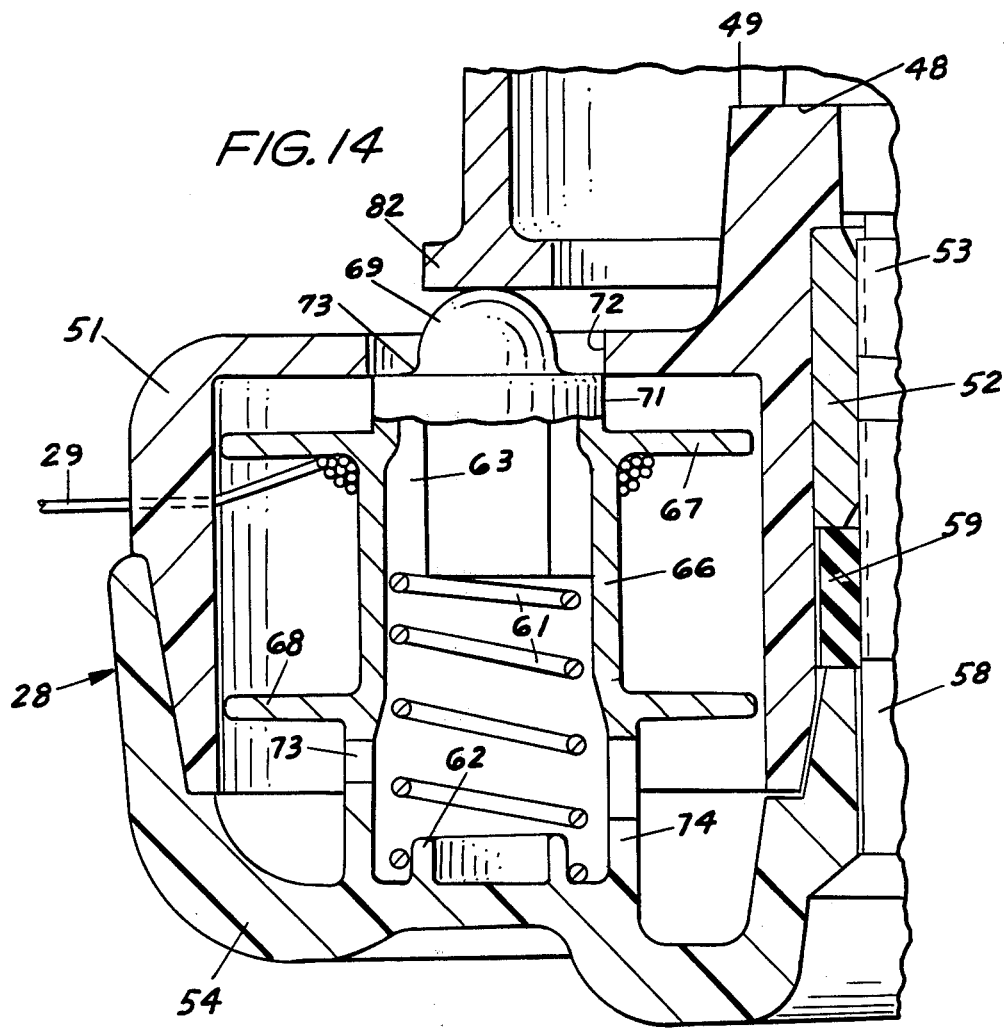
FIG. 14
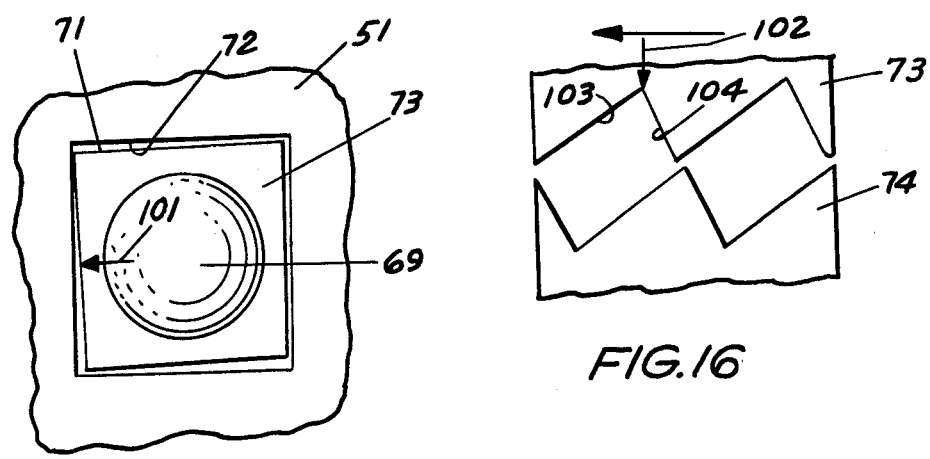
FIG. 15
FIG. 16

APPARATUS FOR CUTTING VEGETATION

This is a continuation of application Ser. No. 818,626, filed July 25, 1977 now abandoned.

BACKGROUND OF THE INVENTION

1. Field of the Invention

This invention relates to the cutting of vegetation and more particularly, it relates to an apparatus for cutting vegetation using a flexible non-metallic line member.

2. Description of the Prior Art

Prior to the Industrial Revolution, mankind was cutting vegetation employing various tools containing cutting edges such as sickles, scythes, scissors and like knife-edged tools. After the Industrial Revolution, the householder established a home having a lawn, garden and like vegetation. After the mid-ninteenth century, the homeowner used lawn care machines which followed basically the concepts of mechanized farming tools such as the reel mower, reaper and side bar cutters. In general, these devices were man-powered. Various types of manually-powered metal knife-edged trimmers and edgers were also available to the homeowner. In the early part of the twentieth century, internal combustion and electrical powered machines became available to the large estate and commercial lawn care artisans.

Smaller types of powered lawnmowers and edgers became available after 1940. Then, the inexpensive gasoline and electric-powered rotary blade lawnmowers, edgers and trimmers became available to both homeowners and commercial workers. In these devices, a metal blade was mounted upon a shaft rotated at several thousand revolutions per minute in a cutting plane. The ends of the blade were sharpened into a knife-like cutting edge. These rotary blade devices cut with a shredding or impact action in contrast with the scissor-like clipping action of the reel lawnmower. However, the economies of manufacture made the rotary-bladed motor-powered lawnmowers, edgers and trimmers readily available at low cost to the public.

The rotary-blade type lawnmowers, edgers and trimmers have one serious defect. This defect resides in the cutting action provided by the heavy metal blade whose cutting edges are traveling at velocities approaching 10,000 feet per minute. The cutting blade has a mass of several pounds, so that the kinetic energy present at the blade's cutting edge is tremendous. The rotating metal blades strike solid objects such as rocks, metal, toys, etc., with great force. As a result, these objects are propelled from the cutting blade at high velocities to cause serious injuries to a human being in their path. Also, direct contact of a foot or other part of a human structure with the rotating blade will cause dismemberment or great mutilation. In the United States within the last few years, there has been anually over 70,000 reported accidents relating to rotary metal-bladed lawnmowers, edgers and trimmers.

Extensive and expensive engineering and experimentation have been performed upon the various types of rotary metal cutting devices to reduce the inherent serious hazard. For example, specially-designed shrouds and dead man controls have been proposed by Industry and governmental agencies in an attempt to reduce the large numbers of serious and disabling injuries. Considerable time has been expended in experimentation to replace the rotary metal blade with a flexible cutting element in rotary lawnmowers, edgers and trimmers. The direct substitution of a resilient rotary blade, such as manufactured of laminated rubber, for rotary metal blades had not been universally successful.

In the early 1960's, a trimmer-edger used a flexible non-metallic line carried on a head rotated within a cutting plane in cutting vegetation. In this device, a relatively low-powered motor rotated a head at relatively high angular speeds and carried a very thin, flexible line of a plastic polymeric material. The device did not succeed operation-wise even in limited trimmer-edger applications because of frequent line breakage, ineffective cutting properties and awkward structures. As a result, these devices found no consumer acceptance as a safe substitute for metal-edge rotary cutting devices.

The utility and structural problems of prior art flexible non-metallic line devices for cutting vegetation were overcome by the inventions which are embodied in U.S. Pat. Nos. 3,708,967; 3,826,068; and 3,859,776. These patents describe apparatus for cutting, trimming and edging vegetation wherein a flexible non-metallic line member of proper length is mounted in a proper head structure to prevent line breakage during operation. The line member has a certain cross-sectional size and a given relationship of peripheral velocity. These features provide a proper, useful and user acceptable device for cutting vegetation. Also, these novel devices provide the most acceptable replacement to rotary metal-blade cutting devices. The cutting devices described in these patents have provided the homeowner and commercial user with vegetation-cutting apparatus using a flexible non-metallic cutting line operated in complete safety to the user and with an optimized cutting efficiency approaching the hazardous metal-blade cutting devices.

These patents show devices provided with structural features which allow the flexible non-metallic line to be selectively extended by manual operation of the user. In example, the user stops operation of the device and manually pulls the line member to a desired extended length. In larger vegetation-cutting apparatus, such as gasoline-powered edgers and trimmers, line extension can be a hindrance to most efficient cutting operation. Frequent line extensions result when the flexible non-metallic line members contact metal or concrete structures which causes fraying and breakage of the line members.

There are a number of prior art devices which are capable of providing the extension of the line member from the vegetation cutter employing flexible non-metallic lines. However, no device of the prior art has the capability of being actuated by the operator during the operation to feed a certain discrete length of line from the rotating head member under direct mechanical control. Then, the line is re-locked automatically within the head member. Excessive amounts of line member cannot be discharged from the rotating head at any time. Other features and results of the present invention in an apparatus for cutting vegetation using a rotating flexible non-metallic line will be apparent from the following discussion.

SUMMARY OF THE INVENTION

In accordance with this invention, there is provided an apparatus for cutting vegetation which comprises a head member arranged for rotation about an axis generally perpendicular with a cutting plane. The head member is rotated by suitable driving means. Line storage means provide a supply of flexible non-metallic line member to the head member. The head member has at least one line member exit provided therein at a location spaced from the axis of rotation. Feed means are present for feeding the line member from the line storage means outwardly from the line member exit into the cutting plane. The feeding of the line member is assisted by the centrifugal forces generated by rotation of the head member. Actuating means for selectively changing the feed means from a line member non-feeding condition into a line member feeding condition are provided the user. The feed means is returned by a restoring means into the line member non-feeding condition upon a substantially certain discrete length of the line member being extended from the line member exit.

In specific embodiments of this apparatus, one or more line members may be carried upon the head member and extended in unison to the certain discrete length from the line member exits.

DESCRIPTION OF THE DRAWINGS

FIG. 3 is a side view of one line member exit shown on the apparatus of FIG. 2;

FIG. 4 is a vertical section taken through the apparatus generally shown in FIG. 2;

FIG. 5 is an enlarged partial side view of the actuating lever carried upon the apparatus of FIG. 1;

FIG. 7 is a cross-section taken along line 7—7 of FIG. 4;

FIGS. 8, 11 and 14 are partial vertical sections taken alone line 8—8 of FIG. 4;

FIGS. 9, 11 and 15 are top plan views taken along line 9—9 of FIG. 8;

FIGS. 10, 13 and 16 are pictorial representations of ratchet teeth carried upon the spool's lower extremity shown in FIG. 8;

FIGS. 11, 12 and 13 show the spool of FIGS. 8, 11 and 14 advanced about 60 degrees in angular rotation from its initial non-rotating position; and FIGS. 14, 15 and 16 illustrate the spool of FIGS. 8, 11 and 14 having traversed the full angular displacement and re-locked into non-rotating position.

DESCRIPTION OF SPECIFIC EMBODIMENTS

Figure 1:
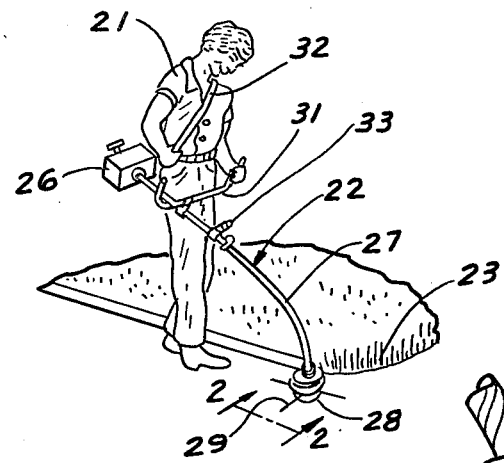
FIG. 1 is a pictorial view of an operator employing one embodiment of an apparatus for cutting vegetation arranged in accordance with the present invention.

Referring now to FIG. 1 of the drawings, there is shown an operator 21 using an apparatus 22 of the present invention to cut grass or vegetation 23 growing along a walkway border 24. Although the apparatus may be a lawnmower or edger embodiment, it will be described herein as the "trimmer 22". However, the trimmer 22 includes elements common to lawnmower and edger devices.

The trimmer 22 includes a source of operating power which can be an internal combustion engine 26 carried at one end of a drive tube 27 which extends downwardly to a rotating head 28. The rotating head carries one or more flexible non-metallic line members 29, such as of a polymeric material (Nylon ®). The motor 26 rotates the head at a suitable angular velocity sufficient to extend the lines 29 from the axis of rotation into a cutting plane which intersects the vegetation 23. The head 28 is preferably rotated at a velocity optimized with the weight of the lines 29 and their radial extension from the head 28. For example, lines 29 have a diameter between 0.035 inches to 0.100 inches extending radially 5 to 9 inches from the head 28, and the head is revolved at between 2500 to 4000 rpm to provide optimum results in cutting the vegetation 23.

The drive tube 27 carries a handle 31 which the operator 21 grasps with his hands. In addition, an over-the-shoulder strap 32 is provided so that the trimmer 22 is more readily balanced by the operator 21. An actuating lever 33 is mounted upon the drive tube 27 adjacent the handle 31. Actuation of the lever 33 by the operator begins the cycle whereby the lines 29 are fed from the head until a certain discrete length of the lines have been extended, and then automatically the lines 29 are re-secured to the head 28 against unintended additional extension.

The operator 21 progresses along the border 24 cutting the vegetation 23 at a suitable rate of advance determined by the capabilities of the motor 26. When the lines 29 become shortened, or it is desired to extend their length from the head 28, or for other reasons, the operator moves the lever 33 towards himself to actuate the line extension cycle. Then the lever 33 is released and the line extension cycle is completed automatically in the trimmer 22.

Figure 2:
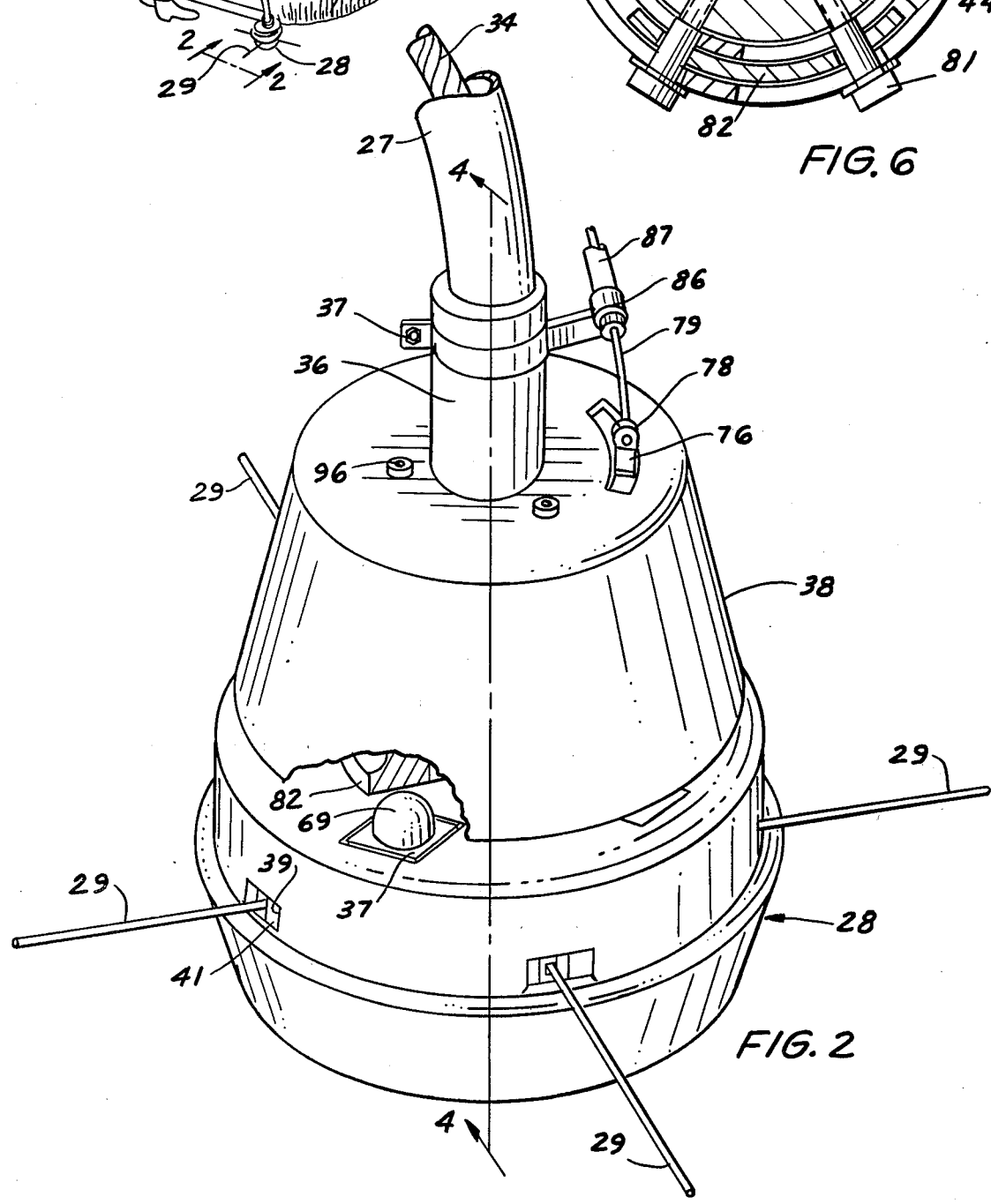
FIG. 2 is an enlarged pictorial view of the lower end of the apparatus shown in FIG. 1.

Referring now to FIG. 2, there is shown an enlarged pictorial representation of the lower portion of the trimmer 22. The drive tube 27 contains internally a flexible drive cable 34 which is interconnected with the motor 26. The lower extremity of the cable 34 is connected with the head 28 and serves to rotate it about an axis of rotation normal to the cutting plane. For this purpose, the tube 27 carries a lower bushing assembly 36 which is secured by clampnut 37. The bushing assembly 36 carries internal bearings to journal the head 28 for rotation about an axis prescribed by the drive tube 27 and bushing assembly 36. Each of the lines 29 is carried upon a spool internal of the head 28. For example, the dust cover 38 is broken away to expose one spool 37. The spool 37 carries a supply of the line 29 which extends from the head 28 through a line exit 39. Referring momentarily to FIG. 3, the line exit 39 may include a metal insert 41 which is apertured to permit the traverse of the line 29 from the spool 37 outwardly of the head 28. The insert 41 provides a low-friction bearing and curvilinear surface for the line 21 so that it is not injured by vibration-induced friction and abrasion.

The specific internal arrangement of the head 28 is more apparent by referring to FIG. 4. The drive cable 34 extends downwardly in the tube 27 for connection to the upper portion of a drive shaft 42 which is journaled by ball bearing assemblies 43 and 44 within the bushing assembly 36. The bearing assemblies 43 and 44 may be lubricated through the mounting of a zerk 46 within the sidewall of the bushing assembly 36. The annulus 45 about the shaft 42 is filled with grease for lubrication purposes. The shaft 42 carries a snap washer 47 to limit downward movement within the ball bearing 44. The lower portion of the shaft 42 is enlarged to provide a seating shoulder 48 upon which seats the topmost surface 49 of the head 28.

Preferably, the head 28 is constructed from molded plastic (Nylon ®) with an upper cylindrical part 51 which carries centrally an insert 52 which is mounted upon threads 53 formed on the lower end of the shaft 42. Preferably, the insert 52 and threads 53 mate in a direction of rotation opposite to the rotation of shaft 42 so that the head 28 does not become disengaged or loosened during operation of the trimmer 22. The lower cylindrical part 54 of the head 28 nests about tapered surfaces 56 of the upper part 51. The part 51 carries shoulder 57 to limit the engagement of the lower part 54. The lower part 54 is secured to the upper part 51 by a stud which threads into the threaded insert 52. A resilient spacer 59 between the lower part 54 and the insert 52 reduces vibrations. With this arrangement, the lower part 54 can be removed readily from the upper part 54 for replacement or insertion of the spools into the head 28.

The head 28 carries several spools 37. The number of spools usually corresponds to the number of lines 29 which extend from the head 28. However, it will be apparent that a plurality of lines 29 could be carried on an individual spool. Thus, four lines can be carried upon two spools, or if desired four lines could even be carried upon one spool and thread the several lines 29 through their respective exits 39 in the head 28.

The line-advancing mechanism embodied in the present invention can be utilized irrespective of the number of spools or lines to be employed.

As to each spool, the novel mechanism provides for locking each spool against rotation in the head except during the line feeding cycle activated by the operator moving the lever 33. During the line feeding cycle, each spool is rotated through a predetermined angular displacement to extend the certain discrete length of line from the head. The spool rotates under direct mechanical control and relocks automatically after rotation is complete. More particularly, the spool 37 in the non-rotating condition is biased in a direction towards the upper part 51 by a spring 61 carried by the lower part 54 of the head 28. The spring 61 does not have to have more than a few ounces of compression in moving the spool 37 towards the upper part 51. An upstanding cylindrical projection 62 is provided on the lower part 54 to engage one or more convolutions of the spring 61 so that it will be held in place when the lower part 54 is removed from the upper part 51. The upper portion of the spring 61 engages projecting shoulders 63 which are formed internally of the spool 37.

In the illustrated embodiment of the present invention, the spool 37 has a cylindrical body 66 which carries the shoulders 63. The body 66 also carries circular flanges 67 and 68 which define a reel upon which the line 29 is coiled for storage purposes. Although the spool 37 may be constructed of any material, it is preferably molded from a thermal plastic such as high-strength polystyrene polymer. The spool 37 and head 28 are provided with elements for locking the spool 37 to the head so that the line 29 cannot be withdrawn or extended unless the lever 33 is moved. When the lever 33 is moved, control elements produce a predetermined relative rotation between the spool 37 and the head 28 so that a discrete length of line 29 is extended from the head 28. In addition, these locking and control elements provide for automatically re-locking the spool 37 to the head 28 whenever the certain discrete length of line 29 has been extended from the rotating head 28. It will be apparent that many locking and control elements can be employed for these purposes. The following elements have been found to be operative in one embodiment of the trimmer 22 which has been reduced to practice. However, other elements of like function and result can be used.

The spool 37 is arranged to be rotated through a certain angular displacement which determines the certain discrete length of line 29 to be extended from the rotating head 28. For example, the head 28 may be of such diameter that a six-inch length of the line 29 provides desired optimum operation. Thus, the spool 37 can be arranged to rotate through an angular displacement permitting a one-inch length of the line 29 to be extended selectively by the operator 21 who is using the trimmer 22 without interrupting his cutting operation. For example, the spool 37 can be rotated through an angular displacement of 90 degrees relative to the head 28 to provide the certain one-inch discrete length of extension of the line 29. However, other angular displacements of the spool 37 in accordance with the present invention can be used where different certain discrete lengths of line 29 are desired to be extended from the head 28.

The spool 37 carries a top hemispherical surface 69 which merges into a locking surface 71 adjacent the cylindrical body 66. The locking surface 71 engages a complementary locking surface 72 formed on the upper part 51 of the head 28. As shown in the drawings, the surface 71 has a noncircular configuration, and preferably is polygonal. For example, the surface 71 can be formed by the equal sides of a square with the complementary surfaces 72 having a corresponding opening shape. Thus, the spool 37 can be locked within the head 28 so as to prevent extension of line at 90-degree angular displacements from any given locked position.

The lower portion of the spool 37 as seen in FIG. 4 carries a control means so that the spool 37 can be angularly displaced through a predetermined rotation relative to the head 28 under direct mechanical control and only when the locking surfaces 71 and 72 are out of engagement. With this arrangement, the spool 37 rotates along the control means within the head 28 so that undesired lengths of the line 39 cannot be thrown from the rotating head 28. It will be appreciated that the line 29 extending several inches from the head 28 can exert a pull of several tens of pounds of tension. The control means carried upon the lower portion of the spool 37 provide for controlled angular displacement of the spool 37 within the head 28 irrespective of the tension on the line 29.

The control means can be ratchet surfaces formed on the spool 37 and the head 28. The spool 37 at its lower extremity has a plurality of teeth 73 forming a ratchet when engaged to complementary teeth 74 formed on the lower part 54 of the head 28. The ratchet formed by teeth 73 and 74 is arranged to cooperate with the locking means provided by the surfaces 71 and 72. For example, locking surfaces 71 and 72 secure the spool 37 at 90 degrees of angular displacement from any locked position in the head 28. The teeth 73 and 74 control the movement during rotation of the spool 37 so that the completion of rotation places the spool 37 in such angular position that the surfaces 71 and 72 re-engage after feeding the certain discrete length of line 29 from the head 28. Thus, depressing the spool 37 to compress the spring 61 moves the locking surfaces 71 and 72 out of engagement and also causes the teeth 73 and 74 to physically engage for limiting rotation of the spool 37 to the predetermined number of degrees. For example, the locking surfaces 71 and 72 lock the spool 37 at 90 degree angular displacement from any locked position. The teeth 73 and 74 permit the spool 37 to rotate only 90 degrees in feeding the line 29 from the head 28.

Any suitable mechanism may be employed for the remote actuation by the operator 21 of the spool 37 from locked, to controlled rotation in feeding out the certain discrete length of the line 29, and then to re-lock automatically the spool 37 within the head 28. In the embodiment shown in FIGS. 2 and 4, the operating lever 33 actuates a mechanical cam for moving the spool 37 downwardly within the head 28 to permit its rotation. For this purpose, an arcuate or circular cam ring 76 is mounted for rotation circumferentially in an enlarged portion 77 of the bushing assembly 36. The cam ring carries an upstanding ear or projection 78 secured to the lower end of a bowden cable 79. The cam ring 76 is rotationally mounted upon the enlarged portion 77 in a plurality of capbolts 81 which are threaded into the bushing assembly 36. The cam ring 76 has slots cut into its side walls for receiving the capbolts 87 and to provide limited angular movement relative to the bushing assembly 36. The cam ring 76 has a downwardly-extending circular slot through which is extended an angular cam foot 82. The cam foot 82 carries a sloping-walled surface 83 which engages the lower surface of cap bolt 87 and the upper surface 84 engaging the cam ring 76. The inclined surfaces 83 and 84 cooperate with the cam ring 76 and capbolt 87 so that as the cam ring 76 is rotated relative to the bushing assembly 36, the cam foot 82 moves vertically downward into engagement with the spool 37 and displaces it sufficiently that the locking surfaces 71 and 72 are moved out of engagement and the teeth 73 and 74 are moved into engagement. Stated in another manner, the movement of the cam ring 36 with the lever 33 causes the cam foot 82 to move the spool from a locked into an unlocked position and the teeth 73 and 74 to advance the spool 37 a predetermined angular displacement. When the operator releases the lever 33, the cam ring 76 returns into its normal operating position responsively to the biasing of the helical spring 83.

Referring momentarily to FIG. 5, the upper end of the bowden cable 79 extends from its sheath 86 adjacent a cable clamp 88 to the lever 33. The lever 33 is movably mounted upon the tube 27 by a clamp 89 with a securing bolt 91. The lever 33 is shown in its position where the helical spring 86 has returned the cam ring 76 into its normal operating position. Moving the lever 33 towards the operator 21 rotates the cam ring 76 about a bushing assembly 36 and causes the cam foot 82 to travel downwardly until the locking surfaces 71 and 72 move out of engagement while the teeth 73 and 74 of the ratchet means are moved into engagement so as to control angular displacement of the spool 37 within the head 27.

Returning to FIG. 4, the cam foot 82 in normal operating position should not rest upon the topmost surface 69 of the spool 37. In addition, the downward displacement of the cam foot 82 towards the lowermost length of travel should be just sufficient so that the teeth 73 and 74 are fully engaged. The enlargement 77 on the bushing assembly 36 may carry a bottom cover 92 to retain a bearing follower 93 and dust cover 94 in contact with the lower extremity of the shaft 42. The upper portion of the enlargement 77 is preferably enclosed by the dust cover 38 which can be secured by cap bolts 96 to the bearing assembly 36.

Figure 6:
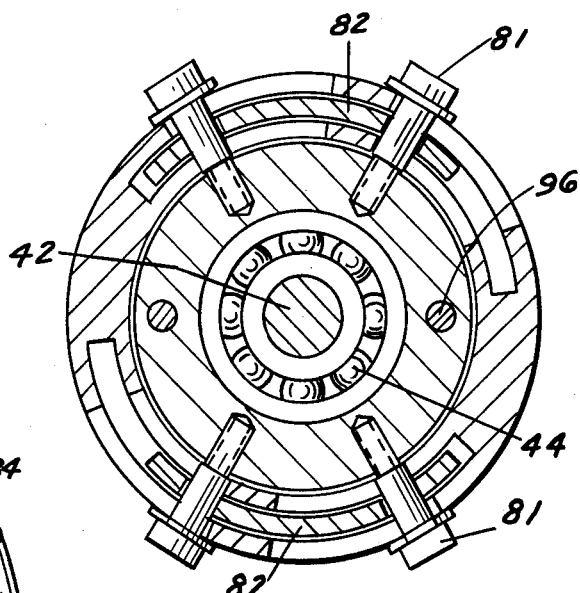
FIG. 6 is a cross-section taken along line 6—6 of FIG. 4.

The arrangement of the cam ring 76 and cam foot 82 carried at the bottom of the bushing assembly 36 may be seen in more detail in FIG. 6.

Referring to FIG. 7, the lower connection of the cable 79 to the cam ring 76 can be seen in greater detail. The sheath 87 enclosing the cable 79 is secured by a clamp 97 beneath one of the cap bolts 96 holding the dust cover 38 to the bushing assembly 36. The end of the cable 79 is secured within the projection 78 so that reciprocation of the cable 79 within the sheath 87 by operation of the lever 33 causes angular movement of the cam ring 76 relative to the bushing assembly 36.

Referring now to FIGS. 8 thru 16, a description will be given of the sequencing from a non-rotating condition to control rotation and return to non-rotating condition of the spool 37 whereby only a discrete length of the line 29 is extended from the head 28 for each operation of the lever 33 by the operator 21 in use of the trimmer 22. In FIGS. 8-10, the spool 37 is shown in a partially downwardly-displaced position where locking surfaces 71 and 72 are coming out of engagement while the teeth 73 and 74 are beginning to engage. As can be seen in FIG. 9, a small amount of clearance exists between complimentary locking surfaces 71 and 72 with the indexing of the spool 37 indicated by an arrow 101 relative to the upper part 51 of the head 28. In FIG. 10, there is a pictorial representation at the same moment as the teeth 73 and 74 have just begun to engage a sufficient distance that the spool 37 could not freely rotate within the head 28 whenever the locking surfaces 71 and 72 come out of engagement. Also, the teeth 73 and 74 are positioned to begin rotation of the spool 37. An indicating arrow 102 is shown on the portion of the spool 37 carrying the teeth 73 for indexing reference.

Figure 11:
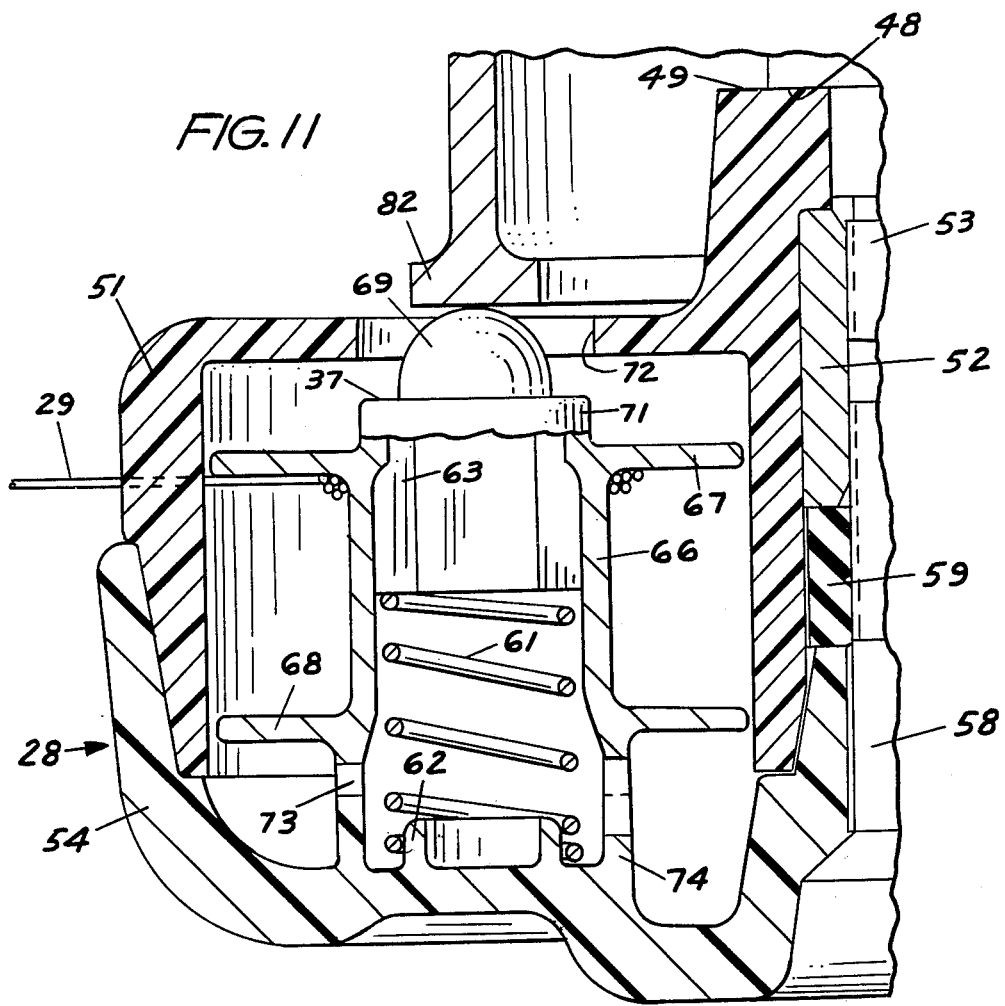
Figure 12:
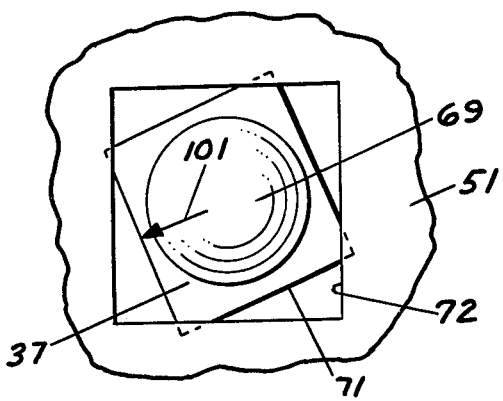
Figure 13:
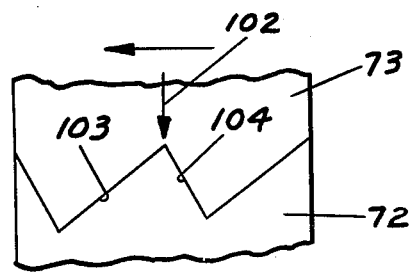

In FIG. 11, the same elements previously described are shown when the cam foot 82 has moved th spool 37 downward to the limit of its travel with the teeth 73 and 74 fully engaged. At this time, the spool 37 has moved a substantial portion of its intended angular displacement relative to the head 28. In reference to FIG. 12, the indexing arrow 101 indicates this position where the surfaces 71 and 72 are completely out of engagement and the spool 37 has been rotated about 60 degrees in the head 28. In FIG. 13, the teeth 73 and 74 are fully meshed with the reference mark arrow 102 having moved a corresponding like angular displacement.

Referring to FIG. 14, the cam foot 82 is shown as it is moving upwardly responsive to the action of the spring 86 returning the cam ring 76 towards its original operating position. At this time the locking surfaces 71 and 72 are moving into a position where they are at engagement. As can be seen in FIG. 15, the reference arrow 101 has moved the remainder of its angular displacement to the next locked position of the spool 37 relative to the head 28. However, as can be seen in FIG. 16, the locking surfaces 71 and 72 have just begun to engage, and the teeth 73 and 74 are slightly disengaged so that the spool 37 cannot spin freely within the head 28. Thus, the teeth limit angular displacement to that particular position where the spool 37 moves upwardly to place the locking surfaces 71 and 72 into a locked position.

As can be seen by reference to the FIGS. 8 thru 14, the sequence timing between the engagement and disengagement of the locking surfaces 71 and 72 and the disengagement and engagement of teeth 73 and 74 are such that at no time when the spool 37 has been unlocked from the rotating head 28 can the spool 37 spin freely within the head 28.

The spool 37 carries the ratchet means formed by the teeth 73 and 74 so arranged that complimentary surfaces between the teeth have leading and trailing surfaces 103 and 104, respectively, arranged in a toothed configuration for positive mechanical control of the spool member 37 while rotating relative to the head 28 when the locking surfaces 71 and 72 are out of engagement. Preferably, the leading surface 101 has an inclined surface less steep than the trailing surface 104. With this arrangement, the initial angular rotation of the spool 37 within the head 28 occurs at a greater angular velocity over the first portion of its angular displacement than during the second portion of its angular displacement. This is preferred since it is desired that the spool 37 not be moving at a high angular velocity whenever the locking surfaces 71 and 72 begin to come into engagement in the arrangement of elements shown in FIGS. 15 and 16.

Although only one spool 37 has been described in construction and function within the head 28, the drawings show that four spools can be accomodated in the head 28. All spools can be arranged in the same manner and construction with identical functioning to the spool 37 so that a plurality of lines 29 are extended simultaneously under the selective actuation by the operator 21 in use of the trimmer 22.

From the foregoing description, it will be apparent tha there has been provided in apparatus and method a novel apparatus using a rotating head with non-metallic flexible line adapted to cut vegetation. In particular, the novel apparatus includes a feed system for extending an incremental length of line from the rotating head into the cutting plane. However, at all other times the cutting line is secured within the head against unintended unreeling. In no event can an excessive or wasteful length of line be extended from the head. It will be understood that certain changes or alterations of the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation and the like, comprising:
   (a) a head member arranged for rotation about an axis generally perpendicular with a cutting plane;
   (b) driving means for rotating said head member;
   (c) at least one spool member containing a coiled portion of a flexible non-metallic line member and each said spool member mounted for rotation within said head member;
   (d) said head member having for each line member a line member exit provided therein at a location spaced from the axis of rotation;
   (e) feed means adapted for feeding an uncoiled portion of said line member from each said spool member outwardly from said line member exit into the cutting plane by the rotation of each said spool member within said head member and the feeding of said line members being assisted by centrifugal forces generated by rotating said head member, and said feed means including complementary toothed surfaces on each said spool member and head member with said complementary toothed surfaces controlling angular movement of each said spool member to a predetermined angular displacement within said head member;
   (f) actuating means for selectively placing said feed means in response to an actuating signal into an operate condition by moving said complementary toothed surfaces into engagement while complementary locking surfaces provided on each said spool member and head member are moved out of engagement to rotate each said spool member within said head member for feeding each said line member from said feed means outwardly from one of said line member exits; and
   (g) restoring means for returning said feed means into a locked condition for holding each said spool member against rotation by moving said complementary toothed surfaces out of engagement while moving said complementary locking surfaces into engagement thereby securing each said line member against additional feeding from said line member exit upon a substantially certain discrete length of each said line member being extended from each said line member exit responsively to said actuating signal.

2. The apparatus of claim 1 wherein said complementary toothed surfaces have inclined tooth surfaces that are adapted for sliding movement between said spool member and said head member during initiation and termination of rotation of said spool member in timed sequence with said actuating means moving said complementary locking surfaces out of engagement for placing said feeder means into the operate condition and said restoring means returning said feed means into the locked condition by moving said complementary locking surfaces into engagement when said spool member is held against rotation within said head member.

3. The apparatus of claim 2 wherein said complementary toothed surfaces have leading and trailing inclined tooth surfaces arranged in a non-symmetrical toothed configuration.

4. The apparatus of claim 3 wherein said leading inclined tooth surfaces have an inclined slope less steep than said trailing inclined tooth surfaces in the non-symmetrical toothed configuration relative to the cutting plane.

5. The apparatus of claim 3 wherein said leading inclined tooth surfaces in said non-symmetrical toothed configuration are arranged to engage initially when said actuating means places said feed means into the operate condition by moving said complementary locking surfaces out of engagement.

6. The apparatus of claim 3 wherein said trailing inclined tooth surfaces in said non-symmetrical toothed configuration are arranged to disengage terminally when said restoring means returns said feed means into the locked condition by moving said complementary locking surfaces into engagement.

7. The apparatus of claim 3 wherein said leading inclined tooth surfaces and said trailing inclined tooth surfaces in said non-symmetrical toothed configuration are arranged to engage and disengage, respectively, before and after said feed means is placed into the operate condition and returned to the locked condition by moving said complementary locking surfaces out of and into engagement, respectively.

8. The apparatus of claim 3 wherein said leading and trailing inclined tooth surfaces have a saw-toothed configuration.

9. The apparatus of claim 8 wherein said trailing inclined tooth surfaces have a more inclined slope than said leading inclined tooth surfaces relative to the cutting plane whereby said spool member rotates at a first angular velocity and then at a lesser angular velocity within said head member.

10. The apparatus of claim 9 wherein said first angular velocity governs spool member rotation over greater than one-half of its angular displacement within said head member.

11. The apparatus of claim 3 wherein at least one pair of said leading and trailing inclined tooth surfaces correspond to one tooth in said non-symmetrical toothed configuration and said tooth controls the angular displacement of said spool member in rotation.

12. The apparatus of claim 11 wherein at least four of said tooth comprise said non-symmetrical toothed configuration.

13. An apparatus for cutting vegetation and the like, comprising:
   (a) a circular head member arranged for rotation about an axis of rotation generally perpendicular with a cutting plane and said head member having an internal cavity formed in a first side thereof;
   (b) driving means for rotating said head member from a second side.
   (c) at least one spool member selectively insertable from said first side of said head member into said cavity and said spool member containing a coiled portion of a flexible non-metallic line member, and each said spool member mounted for rotation within said head member about an axis parallel to the rotational axis of said head member;
   (d) said head member having for each line member a line member exit provided therein at a location spaced from the axis of rotation;
   (e) feed means adapted for feeding an uncoiled portion of said line member from each said spool member outwardly from one of said line member exits into the cutting plane and the feeding of said line members being assisted by centrifugal forces generated by rotating said head member;
   (f) control means cooperative with said head member and said spool member for allowing only a predetermined angular displacement of each said spool member in rotation when feeding said line members outwardly from said line member exits, and said control means including complementary inclined tooth surfaces forming ratchet means to control angular movement of each said spool member within said head member;
   (g) locking means to secure said spool member against rotation in said head member and said locking means on said spool member and said head member including complementary locking surfaces when engaged for securing each said spool member against rotation during the line member non-feeding condition, and resilient means for moving said locking surfaces into engagement.
   (h) actuating means for selectively placing said feed means in response to an actuating signal into an operate condition to rotate each said spool member within said head member for feeding each said line member from said feed means outwardly from said line member exits, and said actuating means including a manual release mechanism for moving said locking surfaces out of engagement, thereby releasing said spool member for rotation in the operate condition of said feed means; and
   (i) restoring means for returning said feed means into a locked condition for holding each said spool member against rotation, thereby securing said line members against additional feeding from said line member exits upon a substantially certain discrete length of said line members being extended from said line member exits responsively to said actuating signal, and said control means cooperating with said locking means whereby said spool members during initiation and termination of rotation are in timed sequence with said locking means so that said restoring means returns said feed means into a locked condition only when said spool members have completed the predetermined angular displacement.

14. The apparatus of claim 13 wherein said control means provides complementary surfaces having leading and trailing surfaces arranged in a toothed configuration for positive mechanical control of said spool member during rotation.

15. The apparatus of claim 14 wherein said leading surfaces have an inclined surface less steep than said trailing surfaces in the toothed configuration relative to the cutting plane.

16. The apparatus of claim 14 wherein said leading surfaces are arranged to engage initially when said actuating means places said feed means into the operate condition.

17. The apparatus of claim 14 wherein said trailing surfaces are arranged to disengage terminally when said restoring means returns said feed means into the locked condition.

18. The apparatus of claim 14 wherein said leading and trailing surfaces in said toothed configuration are arranged to engage and disengage, respectively, before and after said feed means are placed into the operate condition and returned to the locked condition.

19. The apparatus of claim 13 wherein said locking means have complementary non-circular locking surfaces adapted to engage into a non-rotating condition in at least one angular position of each said spool member in said head member.

20. The apparatus of claim 19 wherein said complementary locking surfaces have a polygonal configuration.

21. The apparatus of claim 14 wherein control means comprise a plurality of teeth arranged in a saw-toothed configuration and said complementary locking surfaces are arranged to engage into a non-rotating condition in timed sequence with the predetermined angular rotation of each said spool means permitted by said plurality of teeth.

22. An apparatus for cutting vegetation and the like, comprising:
   (a) a head member arranged for rotation about an axis generally perpendicular with a cutting plane;
   (b) driving means for rotating said head member;
   (c) at least one spool member containing a coiled portion of a flexible non-metallic line member and each said spool member mounted for rotation within said head member;
   (d) said head member having for each line member a line member exit provided therein at a location spaced from the axis of rotation;
   (e) feed means adapted for feeding an uncoiled portion of said line member from each said spool member outwardly from said line member exit into the cutting plane by the rotation of each said spool member within said head member and the feeding of said line members being assisted by centrifugal forces generated by rotating said head member, and said feed means including complementary toothed surfaces carried on each said spool member and head member for controlling angular movement of each said spool member to a predetermined angular displacement within said head member;

(f) actuating means for moving axially said complementary toothed surfaces into engagement while complementary locking surfaces carried on each said spool member and head member are moved axially out of engagement to rotate each said spool member within said head member for feeding each said line member from said feed means outwardly from one of said line member exits; and (g) restoring means for moving axially said complementary toothed surfaces out of engagement while moving axially said complementary locking surfaces into engagement thereby securing each said line member against additional feeding from said line member exit upon a substantially certain discrete length of each said line member being extended from each said line member exit.

23. The apparatus of claim 22 wherein said complementary toothed surfaces have inclined tooth surfaces that are adapted for sliding movement between said spool member and said head member during initiation and termination of rotation of said spool member in timed sequence with said actuating means moving said complementary locking surfaces out of engagement for placing said feeder means into the operate condition and said restoring means returning said feed means into the locked condition by moving said complementary locking surfaces into engagement when said spool member is held against rotation within said head member.

24. The apparatus of claim 22 wherein said complementary toothed surfaces have leading and trailing inclined tooth surfaces arranged in a non-symmetrical toothed configuration.

25. The apparatus of claim 24 wherein said leading inclined tooth surfaces have an inclined slope less steep than said trailing inclined tooth surfaces in the non-symmetrical toothed configuration relative to the cutting plane.

26. The apparatus of claim 24 wherein said leading inclined tooth surfaces in said non-symmetrical toothed configuration are arranged to engage initially when said actuating means places said feed means into the operate condition by moving said complementary locking surfaces out of engagement.

27. The apparatus of claim 24 wherein said trailing inclined tooth surfaces in said non-symmetrical toothed configuration are arranged to disengage terminally when said restoring means returns said feed means into the locked condition by moving said complementary locking surfaces into engagement.

28. The apparatus of claim 24 wherein said leading inclined tooth surfaces and said trailing inclined tooth surfaces in said non-symmetrical tooth configuration are arranged to engage and disengage respectively, before and after said feed means are placed into the operate condition and returned to the locked condition by moving said complementary locking surfaces out of and into engagement, respectively.

29. The apparatus of claim 24 wherein said leading and trailing inclined tooth surfaces have a saw-toothed configuration.

30. The apparatus of claim 29 wherein said trailing inclined tooth surfaces have a more inclined slope than said leading inclined tooth surfaces relative to the cutting plane whereby said spool member rotates at a first angular velocity and then at a lesser angular velocity within said head member.

31. The apparatus of claim 24 wherein at least one pair of said leading and trailing inclined tooth surfaces correspond to one tooth and said non-symmetrical toothed configuration and said tooth controls the angular displacement of spool member in rotation.

32. The apparatus of claim 31 wherein at least four of said tooth comprise said non-symmetrical toothed configuration.

33. An apparatus for cutting vegetation and the like, comprising:

(a) a head member arranged for rotation about an axis generally perpendicular with a cutting plane;

(b) driving means for rotating said head member;

(c) at least one spool member containing a coiled portion of a flexible non-metallic line member and each said spool member mounted for rotation within said head member and for axial movement between first and second positions;

(d) said head member having for each line member a line member exit provided therein at a location spaced from the axis of rotation;

(e) feed means adapted for feeding an uncoiled portion of said line member from each said spool member outwardly from said line member exit into the cutting plane by the rotation of each said spool member within said head member and the feeding of said line members being assisted by centrifugal forces generated by rotating said head member, and said feed means including interfitting teeth means carried on each said spool member and head member with said teeth means controlling angular movement in rotation of each said spool member to a predetermined angular displacement within said head member;

(f) actuating means for axially moving said spool member from the first position to the second position for placing said teeth means into engagement while locking means carried on each said spool member and head member are released to rotate each said spool member within said head member for feeding each said line member from said feed means outwardly from one of said line member exits; and (g) restoring means for moving axially said spool member from the second position to the first position for moving said teeth means out of engagement while engaging said locking means thereby securing each said line member against additional feeding from said line member exit upon a substantially certain discrete length of each said line member being extended from each said line member exit.

34. The apparatus of claim 33 wherein said teeth means have complementary inclined tooth surfaces that are adapted for sliding movement between said spool member and said head member during initiation and termination of rotation of said spool member in timed sequence with said actuating means moving said locking means comprising complementary locking surfaces out of engagement for placing said feeder means into the operate condition and said restoring means returning said feed means into the locked condition by moving said complementary locking surfaces into engagement when said spool member is held against rotation within said head member.

35. The apparatus of claim 33 wherein said teeth means comprises complementary toothed surfaces having leading and trailing inclined tooth surfaces arranged in a non-symmetrical toothed configuration.

36. The apparatus of claim 35 wherein said leading inclined tooth surfaces have an inclined slope less steep than said trailing inclined tooth surfaces in the non-symmetrical toothed configuration relative to the cutting plane.

37. The apparatus of claim 35 wherein said leading inclined tooth surfaces in said non-symmetrical toothed configuration are arranged to engage initially when said actuating means places said feed means into the operate condition by moving said complementary locking surfaces out of engagement.

38. The apparatus of claim 35 wherein said trailing inclined tooth surfaces in said non-symmetrical toothed configuration are arranged to disengage terminally when said restoring means returns said feed means into the locked condition by moving said complementary locking surfaces into engagement.

39. The apparatus of claim 35 wherein said leading inclined tooth surfaces and said trailing inclined tooth surfaces in said non-symmetrical toothed configuration are arranged to engage and disengage respectively, before and after said feed means is placed into the operate condition and returned to the locked condition by moving said complementary locking surfaces out of and into engagement, respectively.

40. The apparatus of claim 35 wherein said leading and trailing inclined tooth surfaces have a saw-toothed configuration.

41. The apparatus of claim 40 wherein said trailing inclined tooth surfaces have a more inclined slope than said leading inclined tooth surfaces relative to the cutting plane whereby said spool member rotates at a first angular velocity and then at a lesser angular velocity within said head member.

42. The apparatus of claim 35 wherein at least one pair of said leading and trailing inclined tooth surfaces correspond to one tooth in said non-symmetrical toothed configuration and said tooth controls the angular displacement of said spool member in rotation.

43. The apparatus of claim 42 wherein at least four of said tooth comprise said non-symmetrical toothed configuration.

44. An apparatus for cutting vegetation and the like, comprising:
(a) a head member arranged for rotation about an axis generally perpendicular with a cutting plane;
(b) driving means for rotating said head member;
(c) at least one spool member containing a coiled portion of a flexible non-metallic line member and each said spool member mounted for rotation within said head member;
(d) said head member having for each line member a line member exit provided therein at a location spaced from the axis of rotation;
(e) feed means adapted for feeding an uncoiled portion of said line member from each said spool member outwardly from said line member exit into the cutting plane by the rotation of each said spool member within said head member and the feeding of said line members being assisted by centrifugal forces generated by rotating said head member, and said feed means including interfitting teeth means on each said spool member and head member with said teeth means controlling angular movement of each said spool member to a predetermined angular displacement within said head member;
(f) actuating means for moving axially said teeth means into engagement while locking means provided on each said spool member and head member are moved axially out of engagement to rotate each said spool member within said head member for feeding each said line member from said feed means outwardly from one of said line member exits; and
(g) restoring means for moving axially said teeth means out of engagement while moving axially said locking means into engagement thereby securing each said line member against additional feeding from said line member exit upon a substantially certain discrete length of each said line member being extended from each said line member exit.

45. The apparatus of claim 44 wherein said actuating means comprises a member moved axially in said head member between first and second positions for inducing rotation of each said spool member over the predetermined angular displacement within said head member.

46. The apparatus of claim 45 wherein said teeth means are complementary toothed surfaces having leading and trailing inclined toothed surfaces arranged in a non-symmetrical toothed configuration.

47. The apparatus of claim 44 wherein said teeth means are arranged to engage and disengage respectively, before and after said locking means are moved out of and into engagement whereby said spool member cannot rotate unless under the positive control of said teeth means during the predetermined angular displacement.

48. The apparatus of claim 44 wherein said teeth means are integrally carried on said spool member and head member, and said spool member moves axially to engage and disengage said teeth means.

* * * * *